United States Patent
Kirillov

(10) Patent No.: US 9,111,231 B2
(45) Date of Patent: Aug. 18, 2015

(54) ASSOCIATING A WEB SESSION WITH A HOUSEHOLD MEMBER

(71) Applicant: GOOGLE INC., Mountain View, CA (US)

(72) Inventor: Roman Kirillov, London (GB)

(73) Assignee: GOOGLE INC., Mountain View, CA (US)

( * ) Notice: Subject to any disclaimer, the term of this patent is extended or adjusted under 35 U.S.C. 154(b) by 135 days.

(21) Appl. No.: 13/631,635

(22) Filed: Sep. 28, 2012

(65) Prior Publication Data

US 2014/0095413 A1 Apr. 3, 2014

(51) Int. Cl.
G06N 99/00 (2010.01)
G06Q 30/02 (2012.01)
H04N 21/258 (2011.01)
H04N 21/426 (2011.01)
H04N 21/436 (2011.01)
H04N 21/61 (2011.01)

(52) U.S. Cl.
CPC .......... *G06N 99/005* (2013.01); *G06Q 30/0201* (2013.01); *G06Q 30/0255* (2013.01); *H04N 21/25883* (2013.01); *H04N 21/42684* (2013.01); *H04N 21/43615* (2013.01); *H04N 21/6125* (2013.01)

(58) Field of Classification Search
None
See application file for complete search history.

(56) References Cited

U.S. PATENT DOCUMENTS

| 8,255,948 | B1 | 8/2012 | Black et al. |
| 2007/0011039 | A1* | 1/2007 | Oddo ............................. 705/10 |
| 2009/0265460 | A1 | 10/2009 | Balasubramanian et al. |
| 2011/0066615 | A1 | 3/2011 | Pradhan et al. |
| 2011/0206198 | A1 | 8/2011 | Freedman et al. |
| 2011/0246641 | A1* | 10/2011 | Pugh et al. .................... 709/224 |

OTHER PUBLICATIONS

Google Inc., International Search Report and Written Opinion, PCT/US2013/062332, Apr. 14, 2014, 7 pgs.

* cited by examiner

*Primary Examiner* — Kakali Chaki
*Assistant Examiner* — Eric Nilsson
(74) *Attorney, Agent, or Firm* — Morgan, Lewis & Bockius LLP

(57) ABSTRACT

A method for associating a web session with a particular member of a group of users includes: receiving a plurality of training web sessions, each training web session including one or more web events generated by a respective known user having one or more demographic attributes; training one or more binary classifiers using the training web sessions and the demographic attributes of the users; receiving a plurality of target web sessions, each target web session including one or more web events that are generated by a respective unknown member of a group of users, wherein each user has one or more demographic attributes; and applying one or more of the binary classifiers to the target web sessions such that a respective target web session is uniquely associated with a member based on, at least in part, the demographic attributes of the member.

18 Claims, 9 Drawing Sheets

Session-User Map 159

- Session 1 280-1
  - Session ID 281
  - Demographic Features
    - Age 282
    - Gender 283
    - Education 284
    - Occupation 285
    - ...
  - Household Member
    - Household Member ID 286
    - Confidence Level 287
- Session 2 280-2
- ...

FIG. 2D

Demographic Dataset 157

- Household 1 260-1
  - Household ID 262
  - Household Address 264
  - Household Income 268
  - Member A 269-A
    - Member ID 271
    - Age 272
    - Gender 273
    - Education 274
    - Occupation 275
    - ...
  - Member B 269-B
  - ...
- Household 2 260-2
- ...

FIG. 2C

Session-based Feature Vectors 151

- Session 1 250-1
  - Session ID 251
  - Feature A 253-A
    - Feature ID 255
    - Feature Value 257
  - Feature B 253-B
  - ...
- Session 2 250-2
- ...

FIG. 2B

ASSOCIATING A WEB SESSION WITH A HOUSEHOLD MEMBER

TECHNICAL FIELD

The disclosed implementations relate generally to tracking a user's activities on the Internet, and in particular, to system and method for associating a web session from a household with a particular member of that household that has expressly agreed to have its web browsing activities being surveyed.

BACKGROUND

Nowadays, people at home spend more and more time on the Internet for different purposes, such as checking news and other information, on-line shopping, exchanging information via email or social networking sites, enjoying entertainments such as video or audio clips, etc. A household typically has multiple Internet-accessible devices, such as PCs, smartphones, tablets, game consoles and televisions. Although it is possible to keep track of all the web browsing activities (also known as web events) originated from a particular household, it is difficult to associate a particular web event (e.g., a visit to a particular website during particular time period) with a particular member of the household in a less intrusive manner, which is especially true if the household includes multiple household members that may use different devices to access the Internet at the same time.

SUMMARY

In accordance with some implementations described below, a computer-implemented method for associating a web session with a particular member of a group of users is implemented at a computer system having one or more processors and memory. The method includes: receiving a plurality of training web sessions, each training web session including one or more web events generated by a respective known user having one or more demographic attributes; training one or more binary classifiers using the plurality of training web sessions and the demographic attributes of the associated users; receiving a plurality of target web sessions, each target web session including one or more web events that are generated by a respective unknown member of a group of users, wherein each user has one or more demographic attributes; and applying one or more of the binary classifiers to the plurality of target web sessions such that a respective target web session is uniquely associated with a member of the group of users based on, at least in part, the demographic attributes of the member of the group of users.

In accordance with some implementations described below, a computer system for associating a web session with a particular member of a group of users is disclosed, the computer system including one or more processors and memory storing one or more programs to be executed by the one or more processors. The one or more programs include instructions for: receiving a plurality of training web sessions, each training web session including one or more web events generated by a respective known user having one or more demographic attributes; training one or more binary classifiers using the plurality of training web sessions and the demographic attributes of the associated users; receiving a plurality of target web sessions, each target web session including one or more web events that are generated by a respective unknown member of a group of users, wherein each user has one or more demographic attributes; and applying one or more of the binary classifiers to the plurality of target web sessions such that a respective target web session is uniquely associated with a member of the group of users based on, at least in part, the demographic attributes of the member of the group of users.

In accordance with some implementations described below, a non-transitory computer readable-storage medium storing one or more programs for associating a web session with a particular member of a group of users is disclosed. The one or more programs include instructions for: receiving a plurality of training web sessions, each training web session including one or more web events generated by a respective known user having one or more demographic attributes; training one or more binary classifiers using the plurality of training web sessions and the demographic attributes of the associated users; receiving a plurality of target web sessions, each target web session including one or more web events that are generated by a respective unknown member of a group of users, wherein each user has one or more demographic attributes; and applying one or more of the binary classifiers to the plurality of target web sessions such that a respective target web session is uniquely associated with a member of the group of users based on, at least in part, the demographic attributes of the member of the group of users.

In accordance with some implementations described below, a computer-implemented method for defining a demographic profile for visitors of a website is implemented at a computer system having one or more processors and memory. The method includes: receiving a plurality of web sessions, wherein each web session includes at least one web event associated with a particular website, which is generated by a respective unknown member of a group of users, each user having one or more demographic attributes; applying one or more demographic binary classifiers to the plurality of web sessions such that each web session is uniquely associated with a member of the group of users based on, at least in part, the demographic attributes of the member of the group of users; and defining a demographic profile for visitors of the particular website based on an aggregation of the demographic attributes associated with respective members of the group of users.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

FIG. 2B is a block diagrams illustrating a data structure used for managing session-based feature vectors in accordance with some implementations.

FIG. 2C is a block diagram illustrating a data structure used for managing a demographic dataset in accordance with some implementations.

FIG. 2D is a block diagram illustrating a data structure used for managing a map between web sessions and household members in accordance with some implementations.

DETAILED DESCRIPTION

From the perspective of a content or service provider on the Internet, it is desirable to know demographic information about consumers of its content or services. For example, a cosmetic product provider would find it very valuable to know what type of customers (e.g., male or female, young or adult) are the most frequent visitors to its website. Based on such information, the cosmetic product provider can adjust the products listed on its website so that the frequent visitors are able to find more relevant products. Some implementations determine the demographic information of visitors to a website by engaging a group of Internet users (e.g., members of a household) who have, expressly or implicitly, agreed to have their web browsing activities logged, and then analyzing the activity logs to determine which user has visited particular websites and when. This approach has its own limitations as a household member may access the Internet from any number of devices, such as smartphone and tablet computer, at different times of any time of a day unless the household member agrees to report his or her web browsing activities by, e.g., logging into a particular account whenever he or she starts using the Internet and then logging out of the account whenever the member stops. Without this cumbersome approach, it would be difficult to tell with high confidence which household member is responsible for a particular mouse click that triggers a visit to a particular website, even if the household has as few as two members.

On the other hand, different members of a household may choose to visit different websites. Website preferences demonstrated by different household members are often related to their age, gender, and occupation differences as well as differences in educational level. For example, it is more likely for an adult member, rather than a teenage member of the same household, to visit a news or financial planning website. Similarly, a teenage household member is more likely to spend time on a social network website than the adult member. Although it cannot be ruled out that a visit to a particular financial planning website was initiated by a teenager in a household, a series of web browsing activities by one member of a household during a short time period often provides enough information to serve as a fingerprint of that household member's characteristic web activity. This observation is especially applicable to a small group of users such as a household having four or five members with distinct demographic attributes. Once a particular household member is identified as being responsible for a series of web browsing activities at one or more websites, it is possible to define or draw a demographic profile for visitors of a particular website.

Figure 1A:
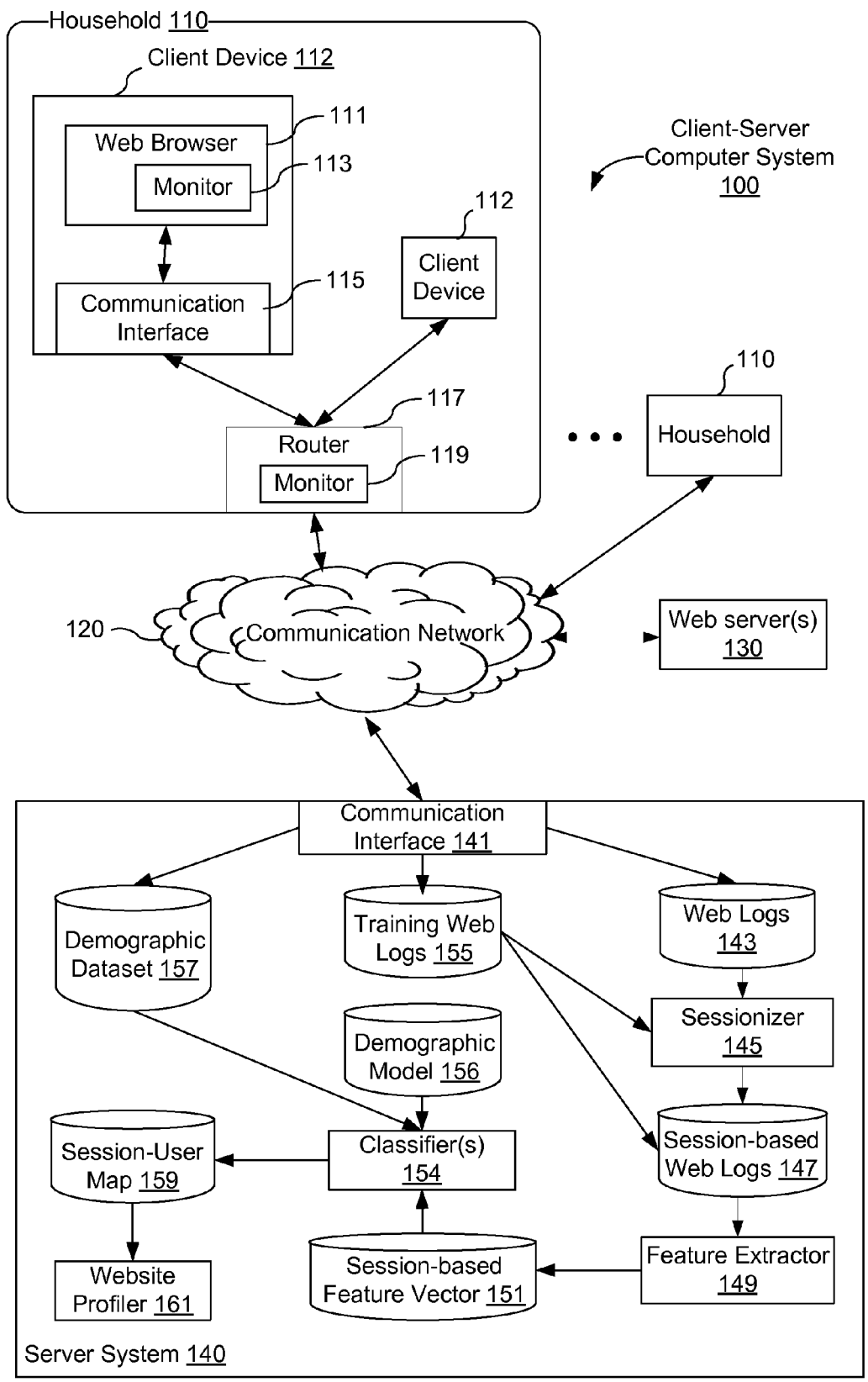
FIG. 1A is a block diagram illustrating a client-server computer system including a plurality of client devices at different households that communicate with a server system that is responsible for associating a web event from a household with a particular member of the household in accordance with some implementations.

FIG. 1A is a block diagram illustrating a client-server computer system 100 including a plurality of client devices 112 at different households 110 that communicate over a communication network 120 (e.g., Internet) with web servers 130 and a server system 140 that is responsible for associating a web event from a household with a particular member of the household in accordance with some implementations. As shown in FIG. 1A, a household 110 may include multiple client devices 112 such as one or more PCs, smartphones, tablets, game consoles, or Internet-enabled TVs or set top boxes. A household member uses a client device 112 to submit requests to the web servers 130 through, e.g., a web browser application 111 and a communication interface 115 of the client device. In response, the web servers 130 return the information or services requested by the household members for display to the household member on the client device 112. In some implementations, a monitor module 113 (which is typically a software application) is installed in the client device, e.g., as a plug-in of the web browser 111 to keep track of the web browsing activities at the client device. In some other implementations, a monitor module 119 is installed in a router 117 within the household to achieve the same purpose by logging the web browsing activities through the router 117.

In the present application, no monitor is installed in any client device or router within a household until after the household has expressly or implicitly agreed that its members' web browsing activities can be logged and analyzed by a third party (e.g., the server system 140). For example, a household may authorize such activity as part of a contract it signs with a service provider that manages the server system 140. The contract may also require that the household provide demographic information of its household members, e.g., age, gender, occupation, educational level, etc. As will be described blow, because the web browsing activities at different households are aggregated at the server system 140 and shared with others in an anonymous way, it is very difficult, if not impossible, for anyone to uncover a particular household member's specific web browsing activities from the aggregated data.

The server system 140 includes a communication interface 141 for exchanging information with other entities on the Internet. For example, the web browsing activities from different households arrive at the communication interface 141 and are then stored in the web log database 143, e.g., in the form of web event records. The server system 140 may also provide demographic information about visitors of a particular website or web browsing information of a particular demographic group to a requesting client device through the communication interface 141.

Figure 5A:
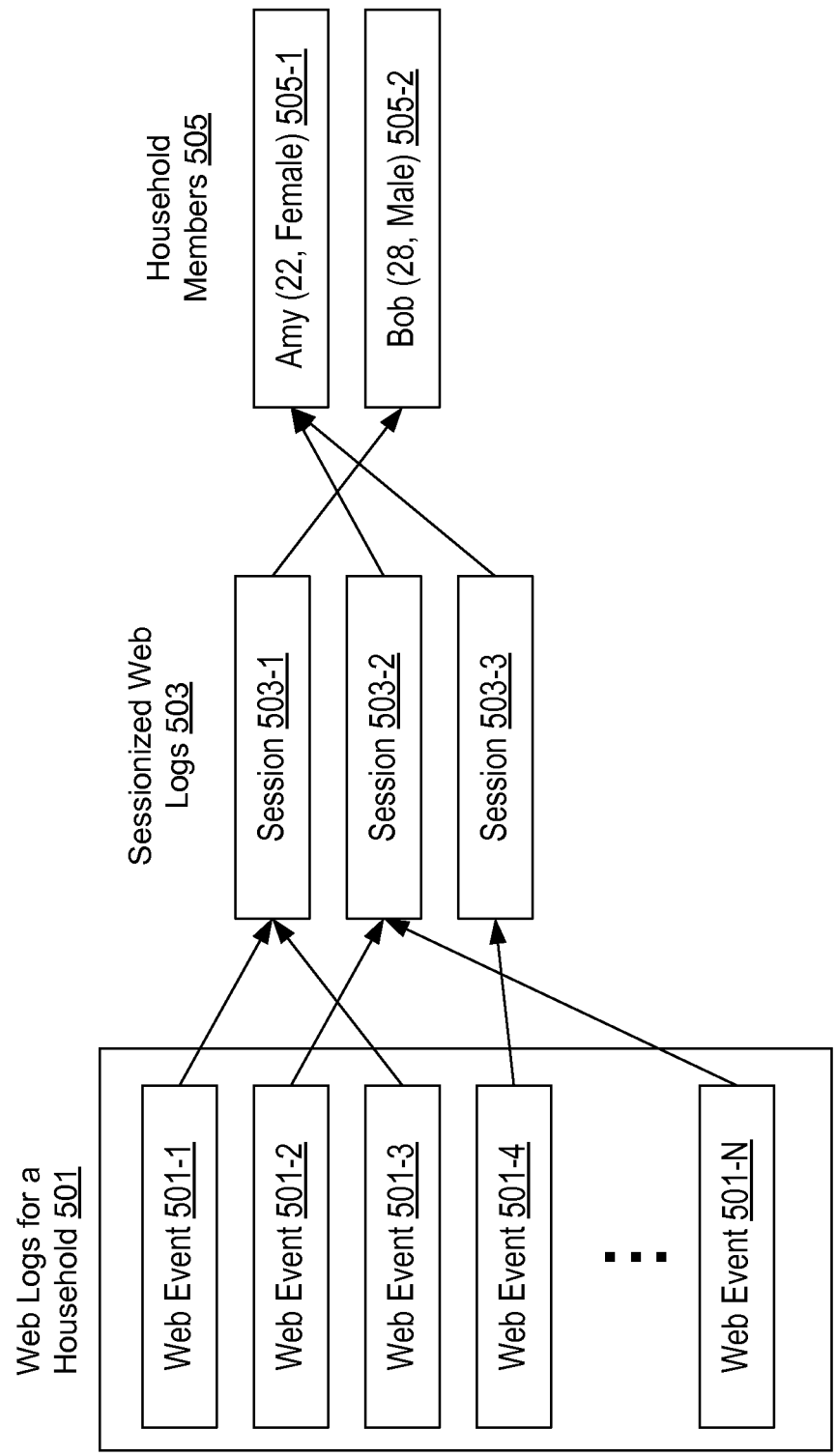
FIG. 5A is a block diagram illustrating a process of sessionizing web events into multiple web sessions and associating each web session with a particular household member in accordance with some implementations.

As noted above, an individual web event (e.g., a visit to a news website) associated with a household member may not be sufficient for representing the household member's unique "taste" for information or services. One of the first steps taken by the server system 140 (or more specifically, the sessionizer 145) after receiving a plurality of web logs from a household is to partition the web logs into different sessions. FIG. 5A is a block diagram illustrating a process of sessionizing web events into multiple web sessions and associating each web session with a particular household member in accordance with some implementations. As shown in the figure, there are a plurality of web events (501-1, 501-2, . . . , 501-N) associated with the household 501. These web events may be generated by the same client device or different client devices in the same household and are ordered by their respective timestamps indicating when they were generated or received by the server system 140. There are many known methods of sessionizing web events. For example, different client devices have different IP addresses or MAC addresses. By checking these parameters, web events coming from different client devices are separated from each other. For example, the web events 501-1 and 501-3 may be generated by a PC in the household and the web events 501-2 and 501-4 may be generated by a tablet in the same household.

Figure 2A:
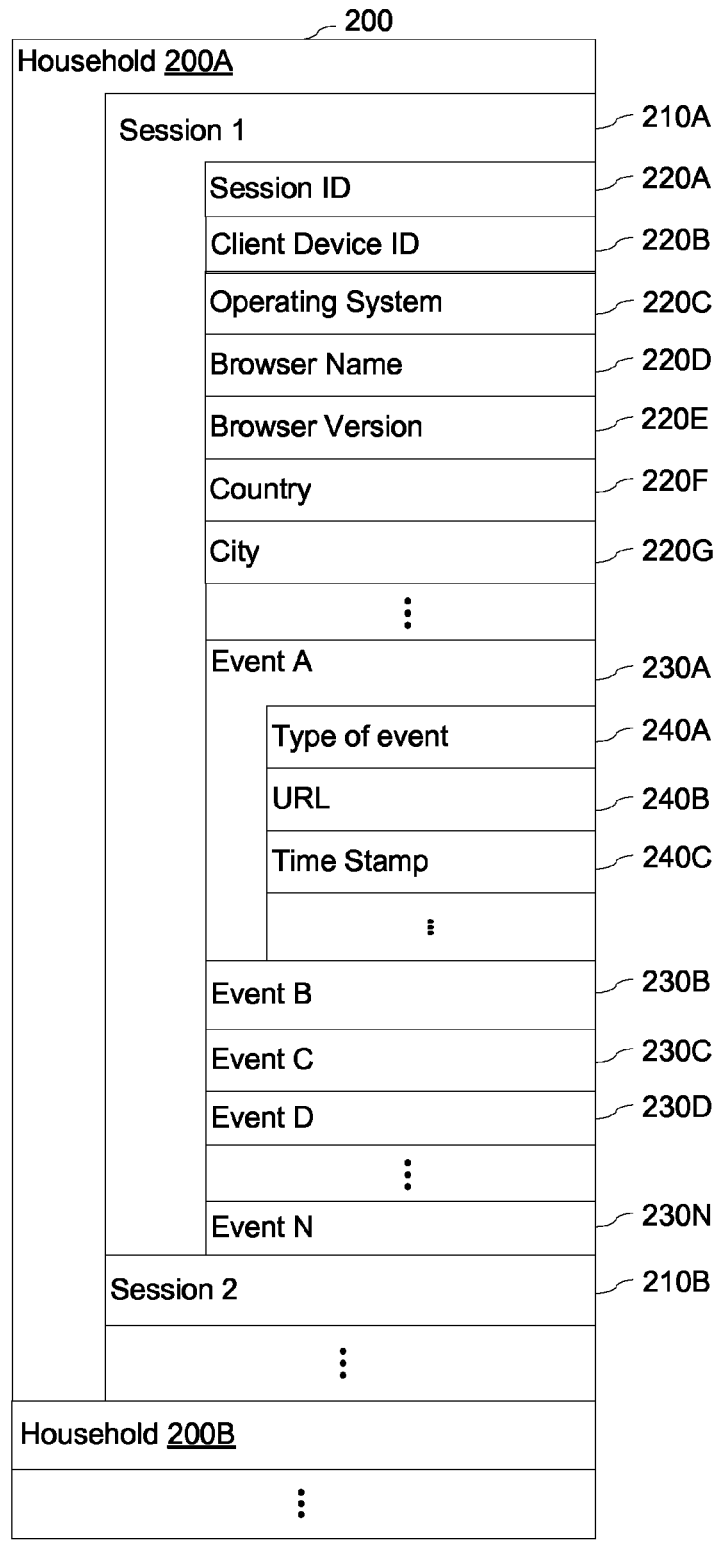
FIG. 2A is a block diagram illustrating a data structure used for managing session-based web logs in accordance with some implementations.

But web events from the same client device are not necessarily associated with the same household member if the client device is being shared by different household members. Therefore, different web events from the client device may be divided into multiple web sessions if they are generated by different household members. Different rules may be used to partition the web events from the same client device. For example, it is assumed that a time difference between two consecutive web events within a web session should be less than ten minutes. In other words, if there is a significant time gap between two consecutive web events, in some implementations the sessionizer 145 creates a new session for the latter of the two consecutive web events. Similarly, it is assumed that a time difference between the first web event and the last web event of one web session should be less than 30 minutes. This rule is used to prevent a web session from having too many web events. As noted above, the present application assumes that there is a demographic-based difference inherent in web browsing activities such that different people may choose to visit different types of websites, which are similar to different frequency bands of a color spectrum. A long web session that includes web events associated with many diverse websites, which is similar to a broad range of the color spectrum, would be difficult to be uniquely associated with any particular household member. Conversely, it is almost harmless if the sessionizer 145 partitions a series of web events associated with one household member into two or more consecutive web sessions as long as each individual web session has enough information to be uniquely associated with a particular household member because, as described below, the multiple web sessions would be associated with the same household member by the classifiers employed by the server system 140. In some implementations, it is assumed that a web session should include at least 10 web events but no more than web events that span over a time period of more than 30 minutes As shown in FIG. 1A, the output of the sessionizer 145 is a plurality of session-based web logs 147 stored in a database. FIG. 2A is a block diagram illustrating a data structure used for managing session-based web logs in accordance with some implementations. The session-based web logs 147 are broken into different households (200A, 200B). In particular, the household 200A includes multiple sessions (210A, 210B) and each session 210A further includes attributes such as a session ID 220A, a client device ID 220B (e.g., the client device's MAC address), the operating system 220C used by the client device, the browser name 220D, the browser version 220E, and geographical information such as country 220F and city 220G as well as a plurality of web events 230A to 230N. Each web event 230A further includes a type of event 240A (e.g., a user click of a URL in a web page or a user input of the URL in the address field of the web browser), a URL 240B visited by the user, and a timestamp 240 associated with the user visit. Note that the session attributes described above are for illustrative purpose and some of the session attributes may be optional whereas some other attributes may be added to the data structure.

The feature extractor 149 receives the session-based web logs 147, generates a feature vector for each web session, and stores the feature vectors in the session-based feature vector database 151. In some implementations, a feature is an abstraction of the content or service provided by a website such as fashion, news, IT, etc. In some other implementations, a large website may be qualified as a feature by itself. Because a web session includes one or more web events, each web event including at least one website, features for characterizing the web session are indeed built on top of features for characterizing individual websites associated with the web session. Since different websites provide different types of contents or services, a unified model is important for representing the content and/or service offered by different websites and comparing them side by side to determine the differences between websites. Over the years, people have developed various models for categorizing the information on the Internet, one of which is the "Open Directory Project" at www.dmoz.org. It should be noted that the present application works with many known website classification models for building a feature vector for a web session that includes one or more web events.

In some implementations, the feature extractor 149 typically is configured to perform the following operations: (i) extract all the possible features from a web event associated with a web session based on a website categorization model; (ii) select among the extracted features, those features that are more likely to be tied with a particular demographic class of users; (iii) aggregate the features selected from different events into a set of session-level features; and (iv) delete some of the session-level features that are of little help to identify a household member. When aggregating the event-level features into the session-level features, there are two possible approaches: (i) a binary approach or (ii) a cumulative approach. The binary approach adds an event-level feature to the set of session-level features only if the event-level feature has no counterpart in the set of session-level features. In other words, the binary approach does not accumulate the same event-level feature associated with multiple websites within one web session. In contrast, the cumulative approach counts the number of times of a particular event-level feature if it is associated with multiple websites within one web session and associates the number of times with a corresponding session-level feature as its weight, which is used to help determine which session-level feature(s) should be deleted. In some implementations, the set of session-level features resulting from the cumulative approach is binary-encoded by eliminating the weights associated with different features. FIG. 2B is a block diagrams illustrating a data structure used for managing session-based feature vectors 151 in accordance with some implementations. The data structure includes multiple feature vectors (250-1, 250-2), one for each web session. Each feature vector includes a session ID 251 and a set of features (253-A, 253-B), each feature including a feature ID 255 and a feature value 257.

In some implementations, a feature vector is a multi-component vector defined in a multi-dimensional feature space and the feature vector typically has one or more non-zero values, each one corresponding to a feature associated with the web session. In some implementations, the magnitude of a non-zero value is defined as a weight of the corresponding feature in the feature space. For example, assuming that a web session includes a first web event associated with www.cnn.com, a second web event associated with www.united.com, and a third web event associated with www.stanford.edu, a resulting feature vector may have at least a non-zero component corresponding to news or media, a non-zero component corresponding to transportation, and a non-zero component corresponding to education.

Figure 1B:
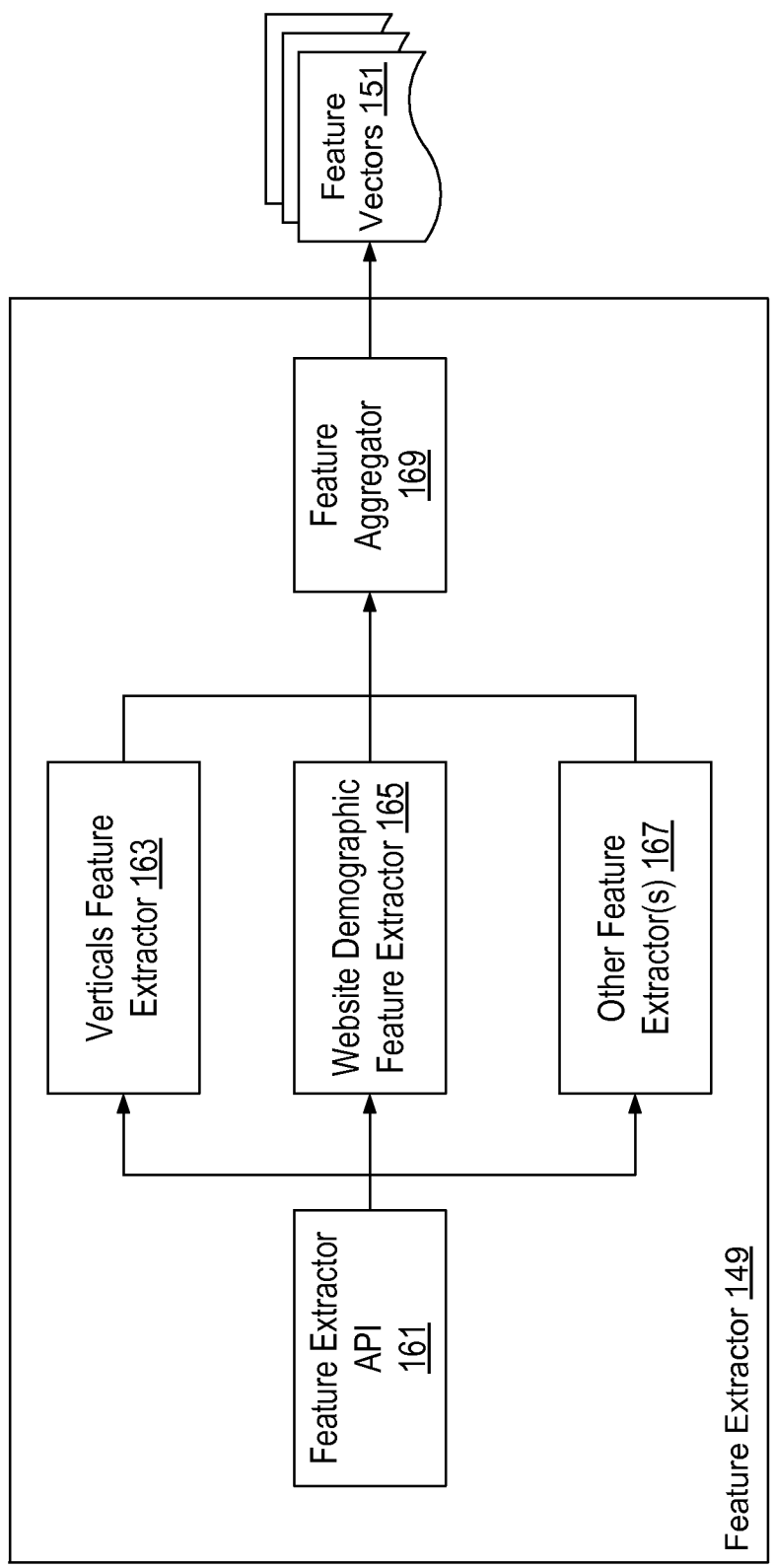
FIG. 1B is a block diagram illustrating the components of a feature extractor in the server system in accordance with some implementations.

FIG. 1B is a block diagram illustrating the components of the feature extractor 159 in the server system in accordance with some implementations. The feature extractor 149 includes a feature extractor API 161 for receiving web session data from the session-based web log database 147. For illustrative purpose, three particular types of feature extractors are depicted in FIG. 1B. The verticals feature extractor 163 extracts verticals (note that "vertical" is a well-known term in the art of web advertisement) from different websites associated with a particular web session. The website demographic feature extractor 165 focuses on those features that are more likely to be associated with a group of users having specific demographic characteristics. For example, the set of features ("Top Gear", "Autotrader", "Slashshot") and the set of features ("OMG", "Boutiques.com", "Elle") most likely point to two gender-based demographic categories, male and female. The other feature extractor 167 is responsible for extracting additional features that are deemed to be useful for identifying a particular household member for the web session. Finally, a feature aggregator 169 combines the features extracted by different extractors into a set of session-level feature vectors as described above and stores them in the session-based feature vector database 151.

One or more classifiers 154 then process the feature vectors and try to identify a unique household member for each feature vector (and therefore for each web session represented by the feature vector). In some implementations, a classifier 154 needs to be trained before it can be used to associate a feature vector with the correct household member. FIG. 1A depicts a mechanism for training the classifiers 154. First, the server system 140 receives a plurality of training web logs 155 and stores them in a database in the server system 140. It is assumed that there is a known relationship between a web event in the training web logs 155 and a respective user who generates the web event. For example, at least some of the web logs are associated with a household that has only one member whose demographic information is known. It is further assumed that the demographic information such as age, gender, occupation, and educational level associated with the user is also known, which is stored in the demographic model 156. If the training web logs 155 have not been sessionized, they will be fed into the sessionizer 145 that converts them into a plurality of training web sessions. If the training web logs 155 have already been sessionized, they will be provided to the feature extractor 149 directly so that the feature extractor 149 generates a feature vector for each training web session.

Figure 5B:
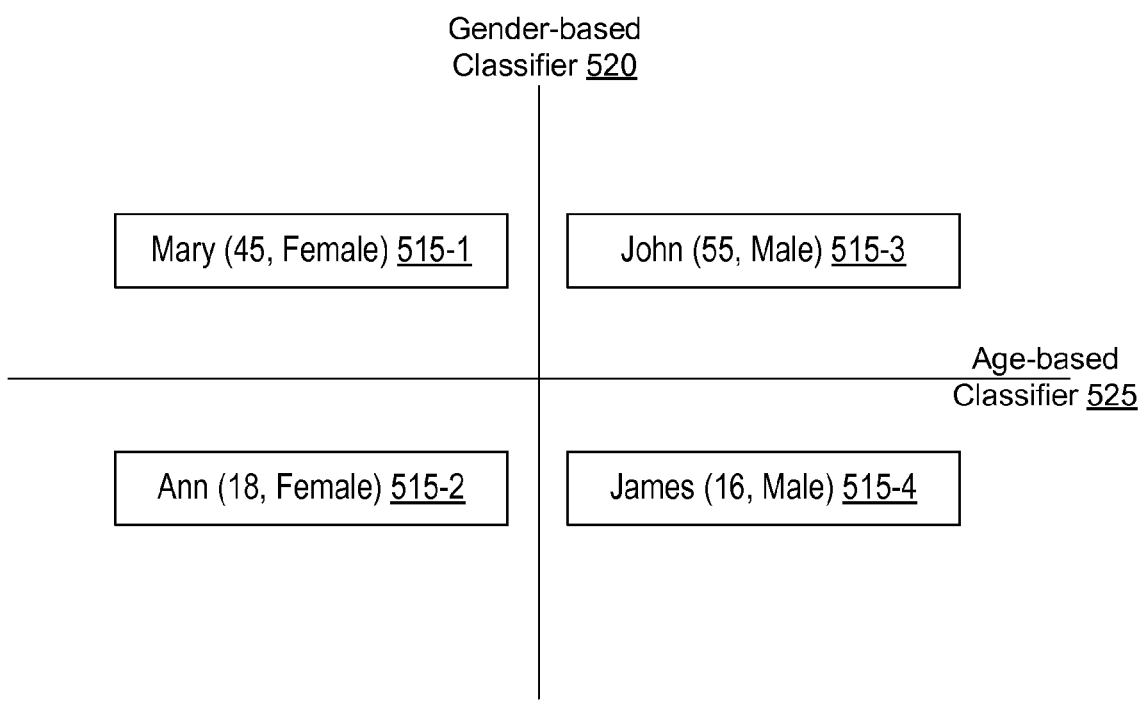
FIG. 5B is a block diagram illustrating a process of using binary classifiers to partition web sessions such that each web session may be uniquely associated with a particular household member in accordance with some implementations.

The feature vectors derived from the training web sessions and the demographic model data 156 are then used to train the classifiers 154. In some implementations, the classifiers 154 include one or more binary classifiers such as an age-based classifier (e.g., age above 30 and age under 30), a gender-based classifier (e.g., male and female), and an educational level classifier (college and non-college). Since most households have no more than five members, an application of two or more binary classifiers to the web sessions from a particular household often produces a very accurate mapping relationship between the web sessions and the corresponding household members. FIG. 5B is a block diagram illustrating a process of using two binary classifiers to partition web sessions such that each web session may be uniquely associated with a particular household member in accordance with some implementations. In this example, the household has four members:

Mary—a mother at the age of 45;
John—a father at the age of 55;
Ann—a daughter at the age of 18; and
James—a son at the age of 16.

Assuming that a plurality of web sessions have been generated for the household, each web session having a feature vector, an application of the gender-based classifier 520 splits the web sessions into two groups, one group of web sessions associated with female household members (including Mary and Ann) and the other group of web sessions associated with male household members (including John and James). The age-based classifier 525 then splits each group of web sessions into two sub-groups. As a result, each of the web sessions is associated with a unique household member as shown in FIG. 5B. In some implementations, the classification result is independent from the order of applying different binary classifiers. For example, the same result shown in FIG. 5B can be achieved by first applying the age-based classifier 525 and then applying the gender-based classifier 520. In some other implementations, the order of applying different classifiers may affect the final result. For example, the classification process begins with most polarized classifiers (e.g., gender-based classifier) such that the two groups of web sessions generated by this classifier are so dramatically different from each other and then applies the less polarized classifiers (e.g., educational-level classifier) in order to achieve the most accurate result.

After being trained by the training web logs 155 and the demographic model 156, the classifiers 154 can be applied to feature vectors associated with a plurality of target web sessions (i.e., web sessions from an unknown member of a particular household) and the associated demographic dataset 157. FIG. 2C is a block diagram illustrating a data structure used for managing the demographic dataset 157 in accordance with some implementations. For each household (260-1 or 260-2), there is a household ID 262, a household address 264, household income level 268 and personal information of each household member (269-A or 269-B) including member ID 271, age, 272, gender 273, education level 274, occupation 275, etc. As noted above, the household has provided such demographic data when it enters into a contract with a third-party agency to allow the agency to log all the web browsing activities from the household. In some implementations, the demographic model 156 is part of the demographic dataset 157.

An application of the classifiers 154 to the session-based feature vectors 151 and the associated demographic dataset generates a session-user map 159. FIG. 2D is a block diagram illustrating a data structure used for managing the session-user map between web sessions and members of a particular household in accordance with some implementations. For each web session (280-1 or 280-2), there are a session ID 281 and a set of demographic features associated with the web session including age 282, gender 283, education 284, and occupation 285, which are determined by the classifiers 154, and information about a particular household member who is identified as being associated with the web session including a household member ID 286 and a confidence level 287. The confidence level is a parameter that indicates the statistical accuracy of the classifiers 154. In some implementations, each binary classifier provides its own confidence level for a particular household and the confidence level 287 is a function of the confidence levels associated with different classifiers (e.g., the lowest one).

As noted above, the session-user map 159 has multiple uses. For example, an advertisement agency can query the session-user map to determine what type of web sessions (e.g., in the form of features vectors, verticals or specific websites) is popular among a particular demographic group of users and then provide target-oriented advertisements on the websites associated with the web sessions. Alternatively, the session-user map 159 can be used by the website profiler 161 to get a profile for visitors to a particular website. As noted above, each web session includes one or more web events, each web event being associated with a particular website. In order to improve the accuracy of the classification result, web events are grouped into different web sessions. But once it is determined that a web session is associated with a particular household member, all the web events are certainly attributed to the same household member. Using the session-user map, it is possible to identify all the visitors from many households to a particular website during a specific time period and their associated demographic information. For example, the website profiler 161 can query the session-user map and determine the demographic composition of visitors to a particular website. Based on such information, an advertisement agency can choose to display advertisements that are more relevant to visitors of the website.

Figure 3:
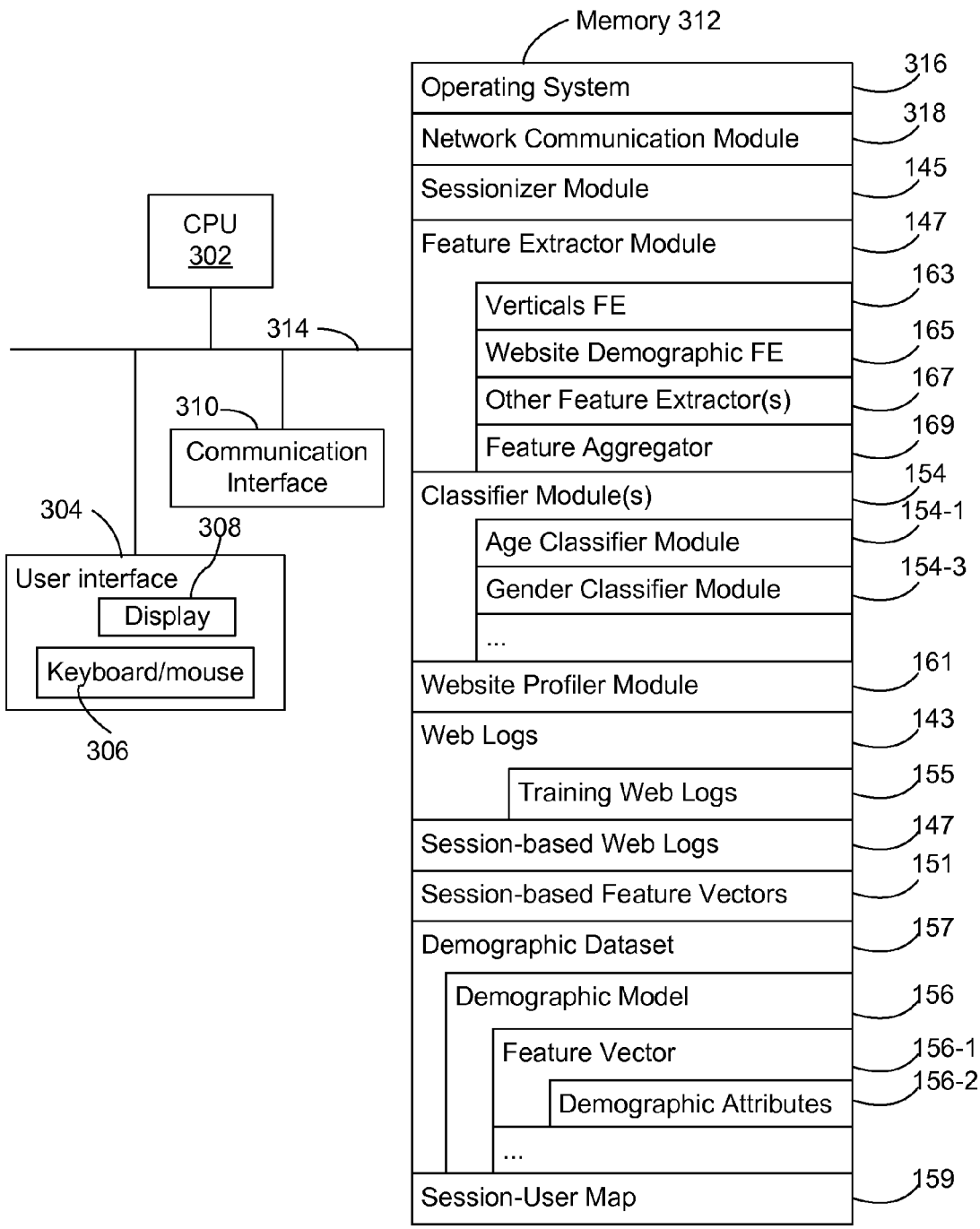
FIG. 3 is a block diagram illustrating the components of a computer server for processing raw web events from a household into web sessions and assigning each web session to a particular member of the household in accordance with some implementations.

FIG. 3 is a block diagram illustrating the components of a computer server system 140 for processing raw web events from a household into web sessions and assigning each web session to a particular member of the household in accordance with some implementations. The computer server system 140 includes one or more processing units (CPU's) 302 for executing modules, programs and/or instructions stored in memory 312 and thereby performing processing operations; one or more network or other communications interfaces 310; memory 312; and one or more communication buses 314 for interconnecting these components. In some implementations, the computer server system 140 includes a user interface 304 comprising a display device 308 and one or more input devices 306 (e.g., keyboard or mouse). In some implementations, the memory 312 includes high-speed random access memory, such as DRAM, SRAM, DDR RAM or other random access solid state memory devices. In some implementations, memory 312 includes non-volatile memory, such as one or more magnetic disk storage devices, optical disk storage devices, flash memory devices, or other non-volatile solid state storage devices. In some implementations, memory 312 includes one or more storage devices remotely located from the CPU(s) 302. Memory 312, or alternately the non-volatile memory device(s) within memory 312, comprises a non-transitory computer readable storage medium. In some implementations, memory 312 or the computer readable storage medium of memory 312 stores the following elements, or a subset of these elements, and may also include additional elements:

- an operating system 316 that includes procedures for handling various basic system services and for performing hardware dependent tasks;
- a network communications module 318 that is used for connecting the computer server system 140 to other computers via the communication network interfaces 310 and one or more communication networks (wired or wireless), such as the Internet, other wide area networks, local area networks, metropolitan area networks, and so on;
- a sessionizer module 145 for grouping web events from a household into different web sessions as described above in connection with FIG. 5A;
- a feature extractor module 147 for extracting a set of features from a web session based on a website classification model, the feature extractor module 147 further including a verticals feature extractor 163, a website demographic feature extractor 165, other feature extractors 167, and a feature aggregator 169, which are described above in connection with FIG. 1B;
- one or more classifier modules 154 for partitioning web sessions associated with a household into two or more groups based on their respective feature vectors, the classifier modules 154 further including an age-based classifier module 154-1, a gender-based classifier module 154-3, and others such as occupation-based classifier module and education-level based classifier module;
- a website profiler module 161 for determining the demographic information of visitors to a particular website based on the session-user map generated by the classifiers 154 as described above in connection with FIG. 1A;
- a plurality of web logs 143, which correspond to the raw web browsing data from a particular household, the web logs 143 further including a plurality of training web logs 155 that are used for training the classifiers 154;
- a plurality of session-based web logs 147 that include a plurality of web sessions derived from the web logs 143;
- a plurality of session-based feature vectors 151, each feature vector including a set of features derived from a particular web session;
- a demographic dataset 157 including the demographic data for a plurality of households that have agreed that their web browsing activities be logged and analyzed by the computer server system 140, the demographic dataset 157 further including a demographic model 156 that is used together with the training web logs 155 for training the classifiers 154 and the demographic model 156 further including a map between a respective feature vector 156-1 associated with a web session and a set of demographic attributes 156-2 of a user that generates the web session; and
- a session-user map 159 that maps a respective web session from the session-based web logs 147 to a particular household member whose demographic attributes are stored in the demographic dataset 157.

In sum, different components within the computer server system 140 work in convert to associate a respective web browsing activity with a member of a particular household.

Figure 4A:
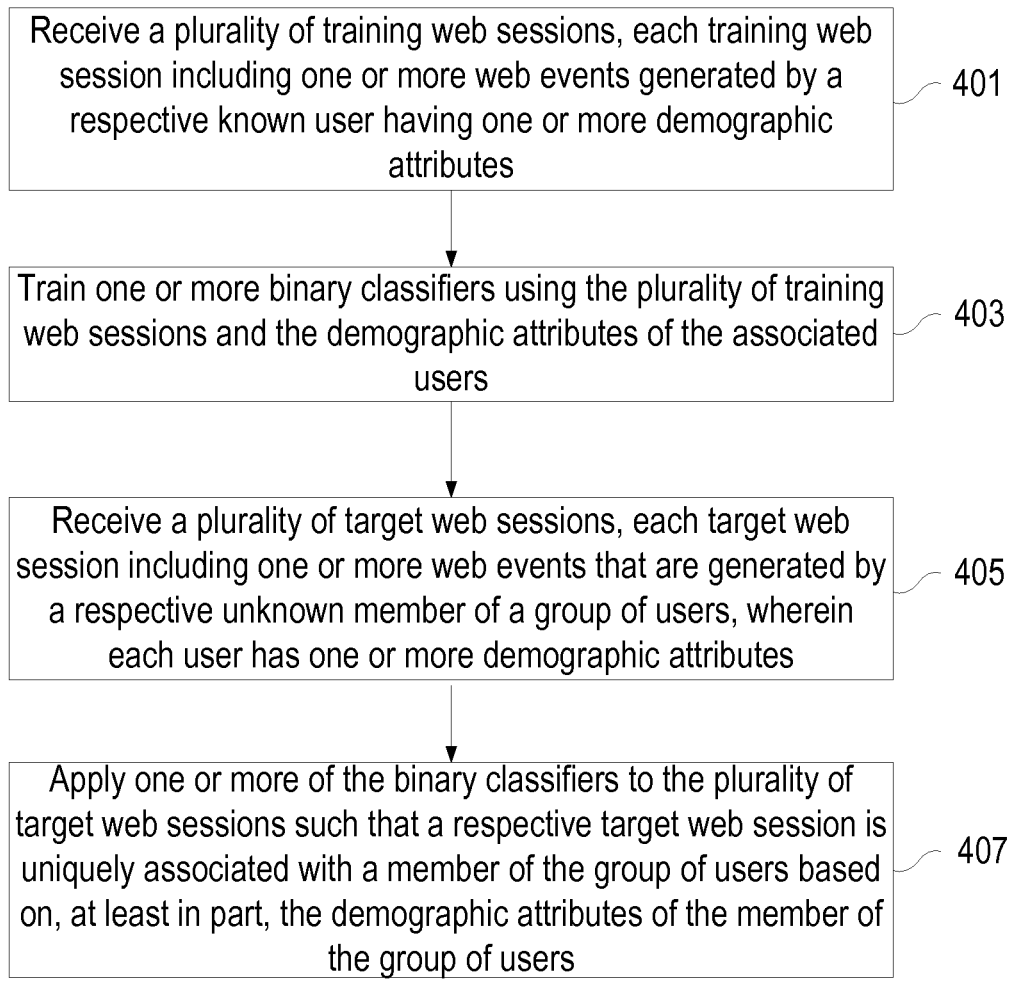
FIG. 4A is a flow chart illustrating how to classify web sessions and associate each web session with a member of a group of users in accordance with some implementations.

FIG. 4A is a flow chart illustrating how the computer server system 140 classifies web sessions and associate each web session with a member of a group of users in accordance with some implementations. Note that the group of users may be members of a household that has agreed to report its web events to a web survey entity. Initially, the computer server system 140 receives (401) a plurality of training web sessions, each training web session including one or more web events generated by a respective known user having one or more demographic attributes. The demographic attributes may include at least one of gender, age, education level, and occupation. In some implementations, at least one of the training web sessions is generated by a household that has only one household member.

The computer server system 140 trains (403) one or more binary classifiers using the plurality of training web sessions and the demographic attributes of the associated users. For example, the computer server system 140 extracts a set of features from the web events of a training web session. Since the web events are generated by a known user (e.g., the only member of a household) whose demographic attributes are known to the computer server system 140 (e.g., being stored in the demographic model 156), the computer server system 140 defines a map between the set of features and one or more of the demographic attributes associated with the user. For each training web session, the computer server system 140 repeats the extracting and defining operations and aggregates the maps associated with respective training web sessions into a demographic model 156.

In some implementations, for each web event, the computer server system 140 identifies one or more event-level characteristics (like those described above in connection with FIG. 1A) based on a web content categorization model and then aggregates the event-level characteristics associated with the respective web events into a set of features associated with the web session with each feature having an associated weight. In some implementations, the computer server system 140 orders the set of features based on their respective weights, selects a subset of the features whose weights are higher than a predefined threshold level and then converts the subset of features into a binary vector of a multi-dimensional space defined by the web content categorization model.

After training one or more binary classifiers, the computer server system 140 receives (405) a plurality of target web sessions to be associated with a respective member of the group of users. In some implementations, each target web session includes one or more web events that are generated by a respective unknown member of the group of users although the demographic attributes associated with each user are known and stored in the demographic dataset. The computer server system 140 applies one or more of the trained binary classifiers to the plurality of target web sessions such that a respective target web session is uniquely associated with a member of the group of users based on, at least in part, the demographic attributes of the member of the group of users. After this step, it is possible for the computer server system 140 to tell which household member is responsible for a particular visit to a specific website at a particular moment and what activities that the household member has conducted while visiting the website.

Figure 4B:
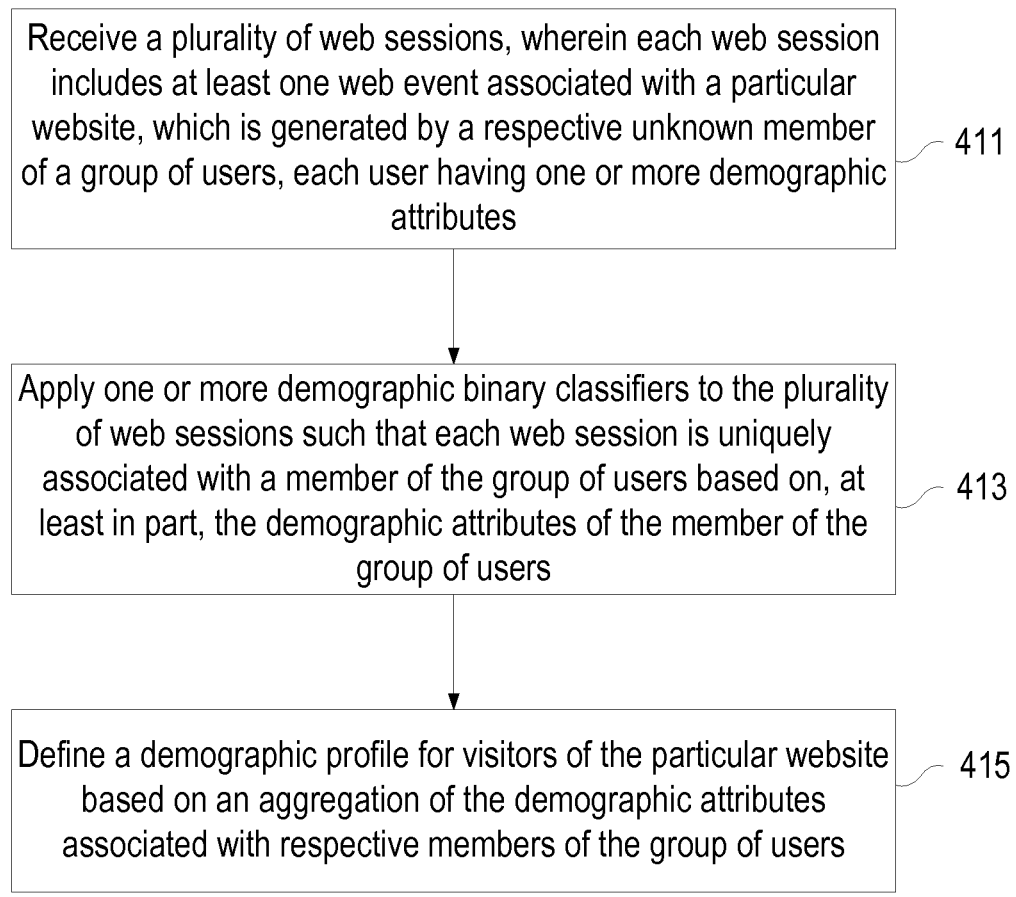
FIG. 4B is a flow chart illustrating how to define a demographic profile for visitors of a website in accordance with some implementations.

As noted above, the session-user map generated by the classifiers may be used for various purposes, one of which is depicted in FIG. 4B, i.e., how to define a demographic profile for visitors of a website in accordance with some implementations. As described above in connection with FIG. 4A, the computer server system 140 first receives (411) a plurality of web sessions. In some implementations, each web session includes at least one web event associated with a particular website, which is generated by a respective unknown member of a group of users, and each user (e.g., a member of a particular household) has one or more demographic attributes known to the computer server system 140. The computer server system 140 then applies (413) one or more demographic binary classifiers to the plurality of web sessions such that each web session is uniquely associated with a member of the group of users based on, at least in part, the demographic attributes of the member of the group of users. Finally, the computer server system 140 defines (415) a demographic profile for visitors of the particular website based on an aggregation of the demographic attributes associated with respective members of the group of users.

In some implementations, the demographic profile includes at least one of (i) a gender ratio between male visitors of the website and female visitors of the website, (ii) an age ratio between visitors of the website whose ages are above a threshold level and visitors of the website whose ages are below the threshold level, and (iii) an educational level ratio between visitors of the website whose educational levels are above a threshold level and visitors of the website whose educational levels are below the threshold level.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method, comprising:
  at a computer system having memory and one or more processors:
    receiving a plurality of training web sessions, each training web session including one or more web events generated by a respective known user having one or more demographic attributes;
    training one or more binary classifiers using the plurality of training web sessions and the demographic attributes of the associated users, wherein the training further comprises:
      extracting a set of features from the web events of a training web session, wherein the web events are generated by a known user who has one or more demographic attributes;
      for each web event, identifying one or more event-level characteristics based on a web content categorization model;
      aggregating the event-level characteristics associated with the respective web events into a set of features associated with the web session, wherein each feature has an associated weight that is based on aggregated number of web events having the feature;
      defining a map between the set of features and one or more of the demographic attributes associated with the user; and
      repeating said extracting and defining operations for one or more of the plurality of training web sessions to aggregate the maps associated with respective training web sessions into a demographic model;
    receiving a plurality of target web sessions, each target web session including one or more web events that are generated by a respective unknown member of a group of users, wherein each user has one or more demographic attributes; and applying one or more of the binary classifiers to the plurality of target web sessions such that a respective target web session is uniquely associated with a member of the group of users based on, at least in part, the demographic attributes of the member of the group of users.

2. The computer-implemented method of claim 1, wherein the group of users are members of a known household that has agreed to report its web events to a web survey entity.

3. The computer-implemented method of claim 1, wherein the one or more demographic attributes include at least one of gender, age, education level, and occupation.

4. The computer-implemented method of claim 1, wherein at least one of the training web sessions is generated by a household that has only one household member.

5. The computer-implemented method of claim 1, wherein the one or more binary classifiers include at least one of gender classifier, age classifier, education level classifier, and occupation classifier.

6. The computer-implemented method of claim 1, further comprising:
ordering the set of features based on their respective weights;
selecting a subset of the features whose weights are higher than a predefined threshold level; and
converting the subset of features into a binary vector of a multi-dimensional space defined by the web content categorization model.

7. A computer-implemented method, comprising:
at a computer system having memory and one or more processors:
receiving a plurality of web sessions, wherein each web session includes at least one web event associated with a first website, and wherein each web session is generated by a respective unknown member of a group of users, each user having one or more known demographic attributes;
applying one or more demographic binary classifiers to the plurality of web sessions such that each web session is uniquely associated with a respective member of the group of users based on, at least in part, the demographic attributes of the respective member of the group of users; and
defining a website demographic profile for the first website based on an aggregation of the demographic attributes associated with respective members associated with the plurality of web sessions.

8. The computer-implemented method of claim 7, wherein the demographic profile includes a gender ratio between male visitors of the website and female visitors of the website.

9. The computer-implemented method of claim 7, wherein the demographic profile includes an age ratio between visitors of the website whose ages are above a threshold level and visitors of the website whose ages are below the threshold level.

10. The computer-implemented method of claim 7, wherein the demographic profile includes an educational level ratio between visitors of the website whose educational levels are above a threshold level and visitors of the website whose educational levels are below the threshold level.

11. A computer system, comprising:
one or more processors;
memory; and
one or more program modules stored in the memory and configured for execution by the one or more processors, the one or more program modules comprising instructions for:
receiving a plurality of training web sessions, each training web session including one or more web events generated by a respective known user having one or more demographic attributes;
training one or more binary classifiers using the plurality of training web sessions and the demographic attributes of the associated users, wherein the training further comprises:
extracting a set of features from the web events of a training web session, wherein the web events are generated by a known user who has one or more demographic attributes;
for each web event, identifying one or more event-level characteristics based on a web content categorization model;
aggregating the event-level characteristics associated with the respective web events into a set of features associated with the web session, wherein each feature has an associated weight that is based on aggregated number of web events having the feature;
defining a map between the set of features and one or more of the demographic attributes associated with the user; and
repeating said extracting and defining operations for one or more of the plurality of training web sessions to aggregate the maps associated with respective training web sessions into a demographic model;
receiving a plurality of target web sessions, each target web session including one or more web events that are generated by a respective unknown member of a group of users, wherein each user has one or more demographic attributes; and
applying one or more of the binary classifiers to the plurality of target web sessions such that a respective target web session is uniquely associated with a member of the group of users based on, at least in part, the demographic attributes of the member of the group of users.

12. The computer system of claim 11, wherein the group of users are members of a known household that has agreed to report its web events to a web survey entity.

13. The computer system of claim 11, wherein at least one of the training web sessions is generated by a household that has only one household member.

14. The computer system of claim 11, wherein the one or more binary classifiers include at least one of gender classifier, age classifier, education level classifier, and occupation classifier.

15. A non-transitory computer readable storage medium storing one or more programs configured for execution by a computer system that includes one or more processors and memory, the one or more programs comprising instructions for:
receiving a plurality of training web sessions, each training web session including one or more web events generated by a respective known user having one or more demographic attributes;
training one or more binary classifiers using the plurality of training web sessions and the demographic attributes of the associated users , wherein the training further comprises:

extracting a set of features from the web events of a training web session, wherein the web events are generated by a known user who has one or more demographic attributes;

for each web event, identifying one or more event-level characteristics based on a web content categorization model;

aggregating the event-level characteristics associated with the respective web events into a set of features associated with the web session, wherein each feature has an associated weight that is based on aggregated number of web events having the feature;

defining a map between the set of features and one or more of the demographic attributes associated with the user; and repeating said extracting and defining operations for one or more of the plurality of training web sessions to aggregate the maps associated with respective training web sessions into a demographic model;

receiving a plurality of target web sessions, each target web session including one or more web events that are generated by a respective unknown member of a group of users, wherein each user has one or more demographic attributes; and applying one or more of the binary classifiers to the plurality of target web sessions such that a respective target web session is uniquely associated with a member of the group of users based on, at least in part, the demographic attributes of the member of the group of users.

16. The non-transitory computer readable storage medium of claim 15, wherein the group of users are members of a known household that has agreed to report its web events to a web survey entity.

17. The non-transitory computer readable storage medium of claim 15, wherein at least one of the training web sessions is generated by a household that has only one household member.

18. The non-transitory computer readable storage medium of claim 15, wherein the one or more binary classifiers include at least one of gender classifier, age classifier, education level classifier, and occupation classifier.

* * * * *